(12) United States Patent
Moon et al.

(10) Patent No.: US 9,190,637 B2
(45) Date of Patent: Nov. 17, 2015

(54) RECHARGEABLE BATTERY

(71) Applicants: SAMSUNG SDI CO., LTD., Yongin-si, Gyeonggi-do (KR); ROBERT BOSCH GMBH, Stuttgart (DE)

(72) Inventors: Jong-Seok Moon, Yongin-si (KR); Hui-Jun Lee, Yongin-si (KR); Joong-Heon Kim, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 128 days.

(21) Appl. No.: 13/938,351

(22) Filed: Jul. 10, 2013

(65) Prior Publication Data

US 2014/0212742 A1     Jul. 31, 2014

(30) Foreign Application Priority Data

Jan. 29, 2013  (KR) ........................ 10-2013-0009878

(51) Int. Cl.
*H01M 2/06* (2006.01)
*H01M 2/30* (2006.01)
*H01M 2/22* (2006.01)

(52) U.S. Cl.
CPC *H01M 2/06* (2013.01); *H01M 2/30* (2013.01); *H01M 2/22* (2013.01)

(58) Field of Classification Search
None
See application file for complete search history.

(56) References Cited

U.S. PATENT DOCUMENTS

2011/0250491 A1\*  10/2011  Kim et al. ..................... 429/176
2011/0311863 A1   12/2011  Byun et al.

FOREIGN PATENT DOCUMENTS

KR    10-2011-0114411 A    10/2011
KR       10-1126809 B1      3/2012

\* cited by examiner

*Primary Examiner* — Patrick Ryan
*Assistant Examiner* — Wyatt McConnell
(74) *Attorney, Agent, or Firm* — Lee & Morse, P.C.

(57) ABSTRACT

A rechargeable battery includes an electrode assembly that performs charging and discharging, a case in which the electrode assembly is installed a cap plate coupled to the case, a lead tab connected to an electrode of the electrode assembly, and an electrode terminal in the cap plate and connected to the lead tab. The electrode terminal includes a column portion inserted into a terminal hole of the cap plate and a flange portion at one end of the column portion, the flange portion being wider than a cross-section of the column portion, and the flange portion being at an inner side of the cap plate. The lead tab includes an insertion portion into which the column portion is inserted, the lead tab being welded in a surface contact manner to the flange portion along an inner surface of an external circumference of the insertion portion.

11 Claims, 8 Drawing Sheets

RECHARGEABLE BATTERY

CROSS-REFERENCE TO RELATED APPLICATION

The present application claims priority under 35 U.S.C. §119 to Korean Patent Application No. 10-2013-0009878, filed on Jan. 29, 2013, in the Korean Intellectual Property Office, and entitled: "Rechargeable Battery," which is incorporated by reference herein in its entirety.

BACKGROUND

1. Field

Embodiments relate to a rechargeable battery.

2. Description of the Related Art

A rechargeable battery, unlike a primary battery, is a battery that can be repeatedly charged and discharged. A small sized rechargeable battery is used as a power supply for small electronic devices such as cellular phones, notebook computers, or camcorders, while a medium or large sized rechargeable battery is used as a power supply for driving motors in hybrid vehicles and the like.

SUMMARY

Embodiments are directed to a rechargeable battery including an electrode assembly that performs charging and discharging, a case in which the electrode assembly is installed, a cap plate coupled to the case, a lead tab connected to an electrode of the electrode assembly, an electrode terminal in the cap plate and connected to the lead tab. The electrode terminal includes a column portion inserted into a terminal hole of the cap plate and a flange portion at one end of the column portion, the flange portion being wider than a cross-section of the column portion, and the flange portion being at an inner side of the cap plate. The lead tab includes an insertion portion into which the column portion is inserted, the lead tab being welded in a surface contact manner to the flange portion along an inner surface of an external circumference of the insertion portion.

The lead tab may include a concave receiving groove corresponding to the flange portion in the inner surface of the external circumference of the insertion portion to receive the flange portion.

The insertion portion may be in a form of a through-hole in the lead tab, the insertion portion corresponding to the column portion of the electrode terminal.

The through-hole may be in a shape of a circle. The column portion may be in the shape of a circular cylinder corresponding to the through-hole.

The flange portion of the electrode terminal may be in a form of a quadrangular plate at one end of the column portion. The receiving groove may be in a form of a quadrangular groove corresponding to the flange portion.

The through-hole may be quadrangle-shaped. The column portion may be in a shape of a quadrangular column corresponding to the through-hole.

The flange portion of the electrode terminal may be in a form of a circular plate at one end of the column portion. The receiving groove may be in a form of a circular groove corresponding to the flange portion.

The insertion portion may be in a form of an opening having one side opened in the lead tab to correspond to the column portion of the electrode terminal.

The opening may be in a shape of a semi-circular curved surface with one open side. The column portion may be in a shape of a circular cylinder corresponding to the curved surface of the opening.

The flange portion of the electrode terminal may be in a form of a circular plate in one end of the column portion. The receiving groove may be in a form of a circular groove corresponding to the curved surface of the flange portion.

The opening may be formed in a shape of a quadrangle having one open side. The column portion may be formed in the shape of a quadrangular column corresponding to the inner surface of the opening.

The flange portion of the electrode terminal may be in a form of a circular plate in one end of the column portion. The receiving groove may be in a form of a circular groove corresponding to the curved surface of the flange portion.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
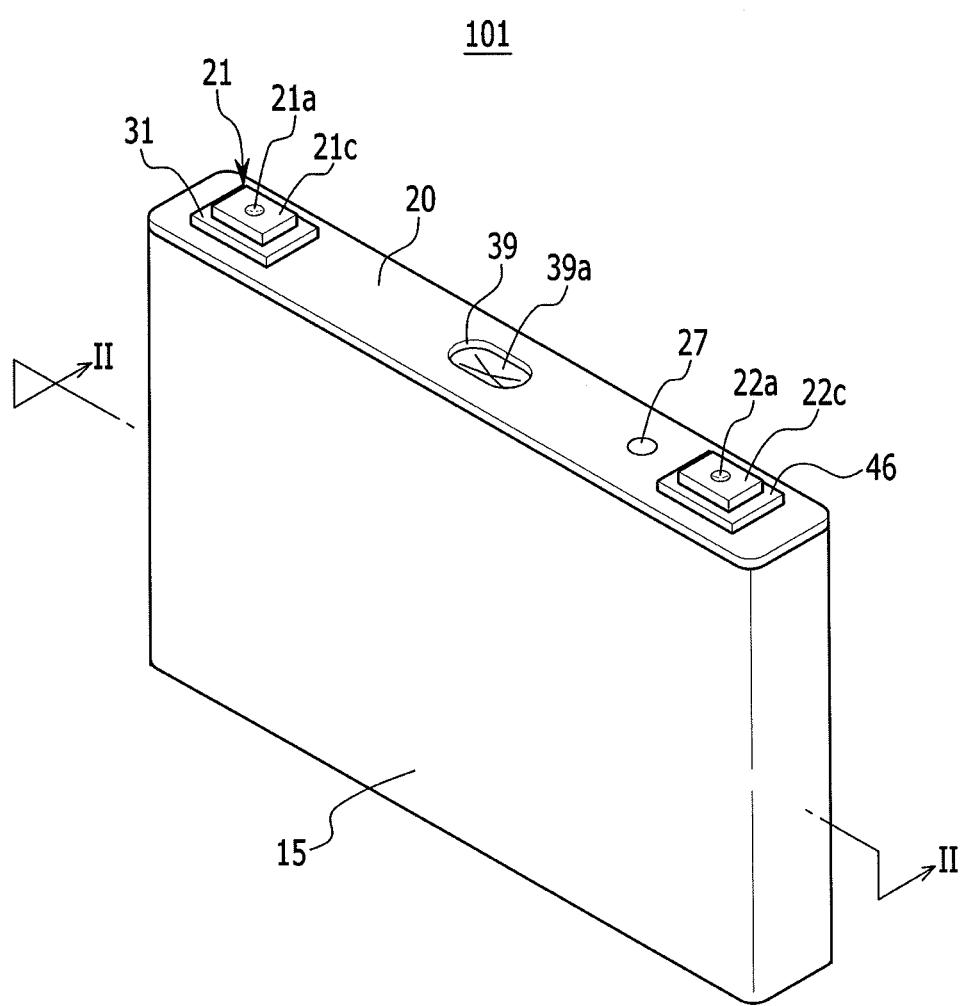
FIG. 1 illustrates a perspective view of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
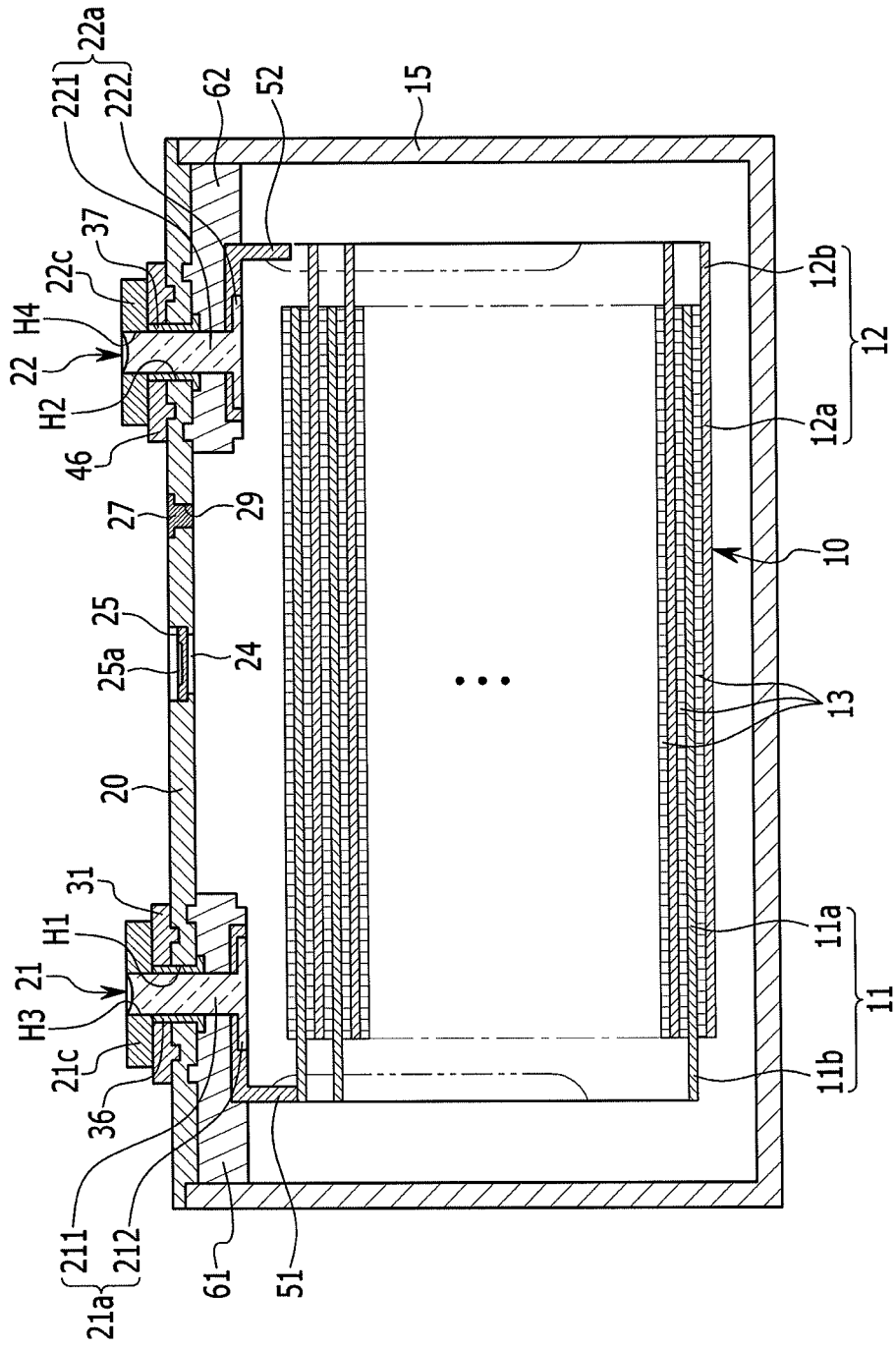
FIG. 2 illustrates a cross-sectional view of FIG. 1, taken along the line II-II.

FIG. 1 illustrates a perspective view of a rechargeable battery according to an exemplary embodiment, and FIG. 2 is a cross-sectional view of FIG. 1, taken along the line II-II.

Referring to FIG. 1 and FIG. 2, a rechargeable battery 101 according to an exemplary embodiment may include an electrode assembly 10 that performs charging and discharging a current, a case 15 in which the electrode assembly 10 is installed, a cap plate 20 coupled to an opening portion of the case 15, lead tabs (e.g., a negative electrode lead tab 51 and a positive electrode lead tab 52) connected to the electrode assembly 10, and electrode terminals (e.g., a negative terminal 21 and a positive terminal 22) provided in the cap plate 20 and connected to the negative electrode lead tab 51 and the positive electrode lead tab 52.

For example, the electrode assembly 10 may be formed by disposing electrodes (for example, a negative electrode 11 and a positive electrode 12) on both surfaces of a separator 13, which is an insulator, and winding the negative electrode 11, the separator 13, and the positive electrode 12 in a jelly-roll state.

The positive electrode and negative electrode 11 and 12 may include coated portions 11a and 12a, in which an active material is applied to a current collector of a metal plate, and uncoated portions 11b and 12b, which are formed as exposed current collectors. An active material is not applied to the uncoated portions 11b and 12b.

The uncoated portion 11b of the negative electrode 11 may be formed at one end of the negative electrode 11 along the wound negative electrode 11. The uncoated portion 12b of the positive electrode 12 may be formed at one end of the positive electrode 12 along the wound positive electrode 12. The uncoated portions 11b and 12b may be disposed at both ends of the electrode assembly 10, respectively.

The case 15 may be shaped approximately in a form of a cuboid so as to provide a space for accommodating the electrode assembly 10. The opening of the case 15 may be formed at one side of the cuboid, so that the electrode assembly 10 may be inserted in the internal space from the outside.

The cap plate 20 may be installed in the opening of the case 15 to seal the case 15. For example, the case 15 and the cap plate 20 may be formed of aluminum to be welded to each other in the opening.

In addition, the cap plate 20 may include at least one opening. For example, the cap plate 20 may be provided with an electrolyte injection opening 29, terminal holes H1 and H2, and a vent hole 24. The electrolyte injection opening 29 may allow the electrolyte to be injected into the case 20 after the case 20 is bonded with the cape plate 40. After injection of the electrolyte, the electrolyte inject opening 29 may be sealed by a sealing cap 27.

The negative terminal 21 and the positive terminal 22 may be respectively provided in the terminal hole H1 and the terminal hole H2 of the cap plate 20 and thus may be electrically connected to the electrode assembly 10. The negative terminal 21 may be electrically connected to the negative electrode 11 of the electrode assembly 10, and the positive terminal 22 may be electrically connected to the positive electrode 12 of the electrode assembly 10. Electrical power generated by the electrode assembly 10 may be drawn out to the outside of the case 15 through the negative terminal 21 and the positive terminal 22.

The negative and positive terminals 21 and 22 may include plate terminals 21c and 22c disposed in an outer side of the cap plate 20 corresponding to the terminal holes H1 and H2 and rivet terminals 21a and 22a electrically connected to the electrode assembly 10. The rivet terminals 21a and 22a may be provided in the cap plate 20 while penetrating the terminal holes H1 and H2 and thus, may be fastened to the plate terminals 21c and 22c.

The plate terminals 21c and 22c may have through holes H3 and H4. The rivet terminals 21a and 22 may penetrate the terminal holes H1 and H2 with upper ends thereof and then may be inserted through the through holes H3 and H4. The rivet terminals 21a and 22a may include column portions 211 and 221 inserted into the terminal holes H1 and H2 of the cap plate 20 and flange portions 212 and 222 provided at one end of the column portions 211 and 221. The flange portions may be formed to be wider than cross-sectional areas of the column portions 211 and 221 and may be provided at an inner side of the cap plate 20.

A negative electrode gasket 36 and a positive electrode gasket 37 may be respectively provided between the column portions 211 and 221 of the rivet terminals 21a and 22a and inner sides of the terminal holes H1 and H2 of the cap plate 20. The negative electrode gasket 36 and the positive electrode gasket 37 may seal between the column portions 211 and 221 of the rivet terminals 21a and 22a and the cap plate 20 and may electrically insulate therebetween.

The negative electrode gasket 36 and the positive electrode gasket 37 are further extended between flanges and the inner side of the cap plate 20 to further seal and electrically insulate between the flanges and the cap plate 20. The negative electrode gasket 36 and the positive electrode gasket 37 may hinder or prevent the electrolyte solution from being leaked through the terminal holes H1 and H2 by securing the negative terminal 21 and the positive terminal 22 in the cap plate 20.

The negative electrode lead tab 51 and the positive electrode lead tab 52 may respectively electrically connect the negative terminal 21 and the positive terminal 22 to the negative electrode 11 and the positive electrode 12 of the electrode assembly 10. The negative and positive electrode lead tabs 51 and 52 will be described in further detail below.

A negative electrode insulation member 61 and a positive electrode insulation member 62 may be respectively provided between the negative electrode lead tab 51 and the positive electrode lead tab 52 to electrically insulate the negative and positive electrode lead tabs 51 and 52 and the cap plate 20. As shown in FIG. 2, the negative electrode gasket 36 and the positive electrode gasket 37 may include flanged portions respectively extending between the negative electrode insulation member 61 and positive electrode insulation member 62 and the cap plate 20.

In addition, the negative electrode insulation member 61 and the positive electrode insulation member 62 may be coupled to the cap plate 20 at one side thereof and may surround the negative and positive electrode lead tabs 51 and 52 and the column portions 211 and 221 and the flange portions 212 and 222 of the rivet terminals 21a and 22a so that the connection structure of the negative and positive electrode lead tabs 51 and 52 and the rivet terminals 21a and 22a may be stable.

An external insulation member 31 may be provided between the plate terminal 21c at the negative terminal 21 side and the cap plate 20 to electrically insulate the plate terminal 21c and the cap plate 20. The cap plate 20 may maintain an electrically insulated state with respect to the negative terminal 21.

The external insulation member 31 and the plate terminal 21c may be coupled to an upper end of the rivet terminal 21a. The upper end of the rivet terminal 21a may be riveted or welded such that the external insulation member 31 and the plate terminal 21c are fastened to the upper end of the rivet terminal 21a. The plate terminal 21c may be provided at the outer side of the cap plate 20, with the external insulation member 31 being interposed therebetween.

A conductive top plate 46 may be provided between the plate terminal 22c at the positive terminal 22 side and the cap plate 20 to electrically connect the plate terminal 22c and the cap plate 20. The cap plate 20 may maintain an electrically connected state with respect to the positive terminal 22.

The conductive top plate 46 and the plate terminal 22c may be coupled to an upper end of the rivet terminal 22a. The upper end of the rivet terminal 22a may be riveted or welded such that the top plate 46 and the plate terminal 22c are fastened to the upper end of the rivet terminal 22a. The plate terminal 22c may be provided at the outer side of the cap plate 20, with the top plate 46 interposed therebetween.

The positive electrode gasket 37 may prevent the rivet terminal 22a and the top plate 46 from being directly electrically connected with each other. The rivet terminal 22a may be electrically connected to the top plate 46 through the plate terminal 22c. Thus, the top plate 46 and the case 15 may have a positive polarity.

A vent hole 24 may be sealed by a vent plate 25. When the internal pressure of the rechargeable battery reaches a predetermined pressure, the vent plate 25 may be ruptured, and thus, the vent hole 24 may be opened to discharge an internal pressure or an internal gas of the rechargeable battery. The vent plate 25 may have a notch 25a that includes a cutout.

The rivet terminals 21a and 22a and the negative and positive electrode lead tabs 51 and 52 may be respectively coupled to each other with the same structure. For convenience, the coupling structure of the rivet terminal 21a of the negative terminal 21 and the negative electrode lead tab 51 will be described.

Figure 3:
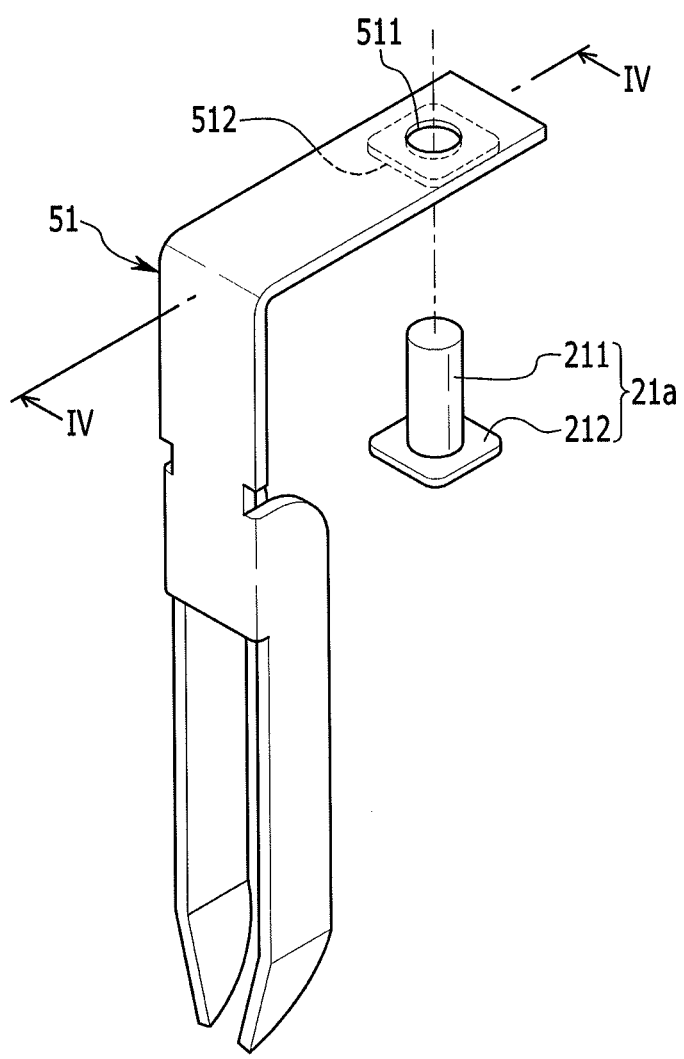
FIG. 3 illustrates an exploded perspective view of a rivet terminal and a lead tab of FIG. 2.
Figure 4:
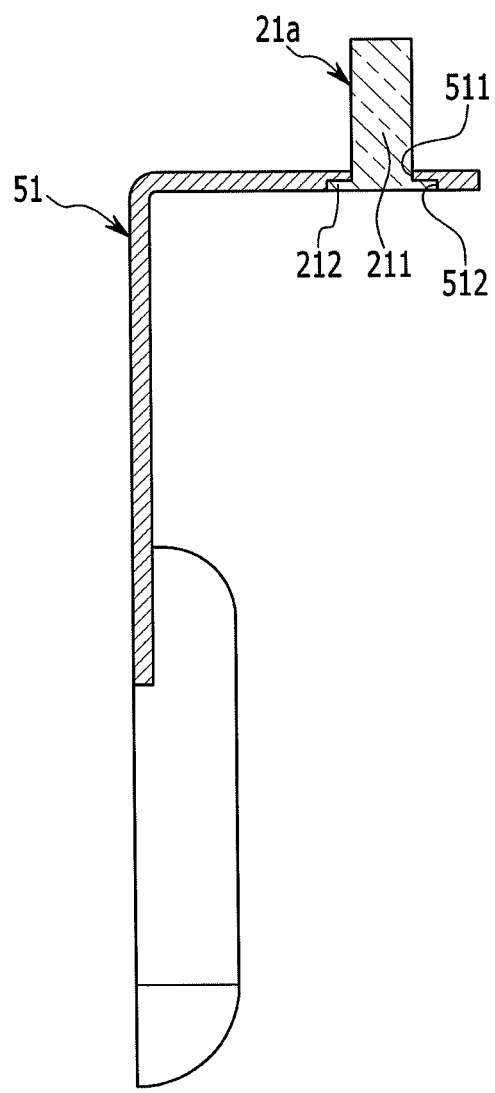
FIG. 4 illustrates a combined cross-sectional view of FIG. 3.

FIG. 3 illustrates an exploded perspective view of the rivet terminal and the lead tab of FIG. 2, and FIG. 4 is a cross-sectional view of the coupling state of FIG. 3, taken along the line IV-IV.

Referring to FIG. 3 and FIG. 4, the negative electrode lead tab 51 includes an insertion portion into which the column portion 211 of the rivet terminal 21a is inserted. For example, the insertion portion may be formed as a through-hole 511 corresponding to the column portion 211 of the rivet terminal 21a.

In a state that the column portion 211 of the rivet terminal 21a is inserted into the through-hole 511, the negative electrode lead tab 51 is welded in a surface contact manner to the flange portion 212 along an inner surface of an external circumference of the through-hole 511.

The negative electrode lead tab 51 may include a receiving groove 512 at an inner side of an external circumference of the through-hole 511. The receiving groove 512 may be concave to correspond to the flange portion 212 so that the receiving groove 512 may receive the flange portion 212 in a state that the column portion 211 is inserted into the through-hole 511.

The through-hole 511 of the negative electrode lead tab 51 may be formed in the shape of a circle, and the column portion 211 of the rivet terminal 21a may be formed in the shape of a circular cylinder corresponding to the shape of the through-hole 511. In other implementations, the flange portion 212 of the rivet terminal 21a may be formed as a quadrangular plate at one end of the column portion 211. The receiving groove 512 may formed as a quadrangular groove corresponding to the flange portion 212.

In a state that the column portion 211 of the rivet terminal 21a is inserted in the through-hole 511, the receiving groove 512 may be stably coupled with the flange portion 212. The rivet terminal 21a and the negative terminal 21 may firmly maintain the coupling state without rotation in the terminal hole H1 of the cap plate 20.

Figure 5:
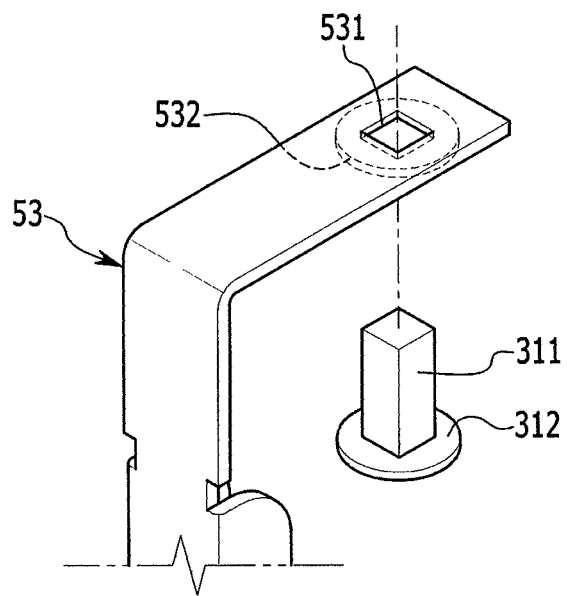
FIG. 5 illustrates an exploded perspective view of a rivet terminal and a lead tab of a rechargeable battery according to another exemplary embodiment.

FIG. 5 illustrates an exploded perspective view of a rivet terminal and a lead tab in a rechargeable battery according to another exemplary embodiment.

Referring to FIG. 5, in this exemplary embodiment, a through-hole 531 of a negative electrode lead tab 53 may be quadrangle-shaped, and a column portion 311 of a rivet terminal 31a may be formed in the shape of a quadrangular column corresponding to the through-hole 531. In addition, a flange portion 312 of the rivet terminal 31a may be formed in the shape of a circular plate at one end of the column portion 311. A receiving groove 522 may be formed in the shape of a circular groove corresponding to the flange portion 312.

In a state that the column portion 311 of the rivet terminal 31a is inserted in the through-hole 531, the receiving groove 532 may stably receive the flange portion 312 while being coupled therewith. That is, the rivet terminal 31a may be firmly maintained in a coupled state without rotation in a terminal hole (not shown) of the cap plate 20.

In a state that the column portion 311 of the rivet terminal 31a is inserted in the through-hole 531, the negative electrode lead tab 53 may be welded in a surface contact manner to the flange portion 312 along an inner side of an external circumference of the through-hole 531.

Referring back to FIG. 2, the negative electrode gasket 36, the terminal hole H1, and the through-hole H3 in the external insulation member 31 and the plate terminal 21c into which the column portion 311 penetrates may be formed in a shape that corresponds to the quadrangular column shape of the column portion 311.

Figure 6:
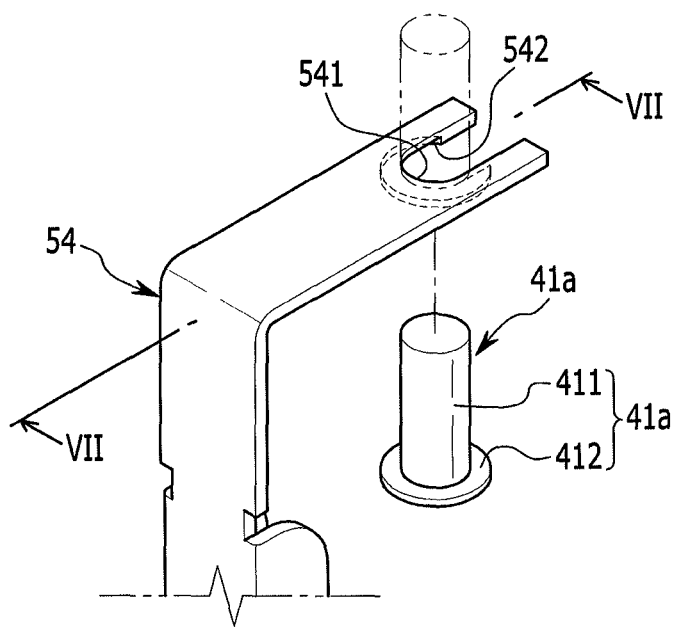
FIG. 6 illustrates an exploded perspective view of a rivet terminal and a lead tab of a rechargeable battery according to another exemplary embodiment.
Figure 7:
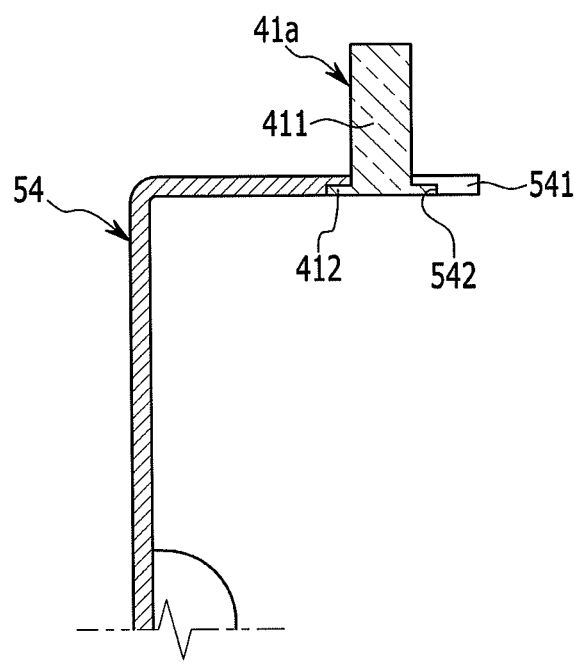
FIG. 7 illustrates a cross-sectional view of the coupling in FIG. 6, taken along the line VII-VII.

FIG. 6 illustrates an exploded perspective view of a rivet terminal and a lead tab of a rechargeable battery according to another exemplary embodiment, and FIG. 7 is a cross-sectional view of the coupling in FIG. 6, taken along the line VII-VII.

Referring to FIG. 6 and FIG. 7, in this exemplary embodiment, an insertion portion may be formed as an opening 541 opened at one side in a negative electrode lead tab 54 to correspond to a column portion 411 of a rivet terminal 41a. The opening 541 may be formed in the shape of a semi-circular curved surface and may have one open side. The column portion 411 may be formed in the shape of a circular cylinder corresponding to the curved surface of the opening 541.

A flange portion 412 of the rivet terminal 41a may be formed as a circular-shaped plate at one end of the column portion 411. In addition, a receiving groove 542 may be formed as a circular-shaped groove corresponding to the curved surface of the flange portion 412.

The rivet terminals 21a and 31a illustrated in the exemplary embodiments of FIGS. 1 through 5 may be inserted from a bottom direction of the insertion portions of the negative electrode lead tabs 51 and 53, formed as the through-holes 511 and 531.

In contrast, the rivet terminal 41a in this embodiment may be inserted from a side direction of an insertion portion of a negative electrode lead tab 54, formed as the opening 541. Thus, the rivet terminal 41a of this exemplary embodiment may be easily coupled to the negative electrode lead tab 54.

In a state that the column portion 411 of the rivet terminal 41a is inserted into the opening 541, the receiving groove 542 may be stably coupled with the flange portion 412. In a state that the column portion 411 of the rivet terminal 41a is inserted into the opening 541, the negative electrode lead tab 54 may be welded in a surface contact manner to the flange portion 412 along an inner surface of an external circumference of the opening 541.

Figure 8:
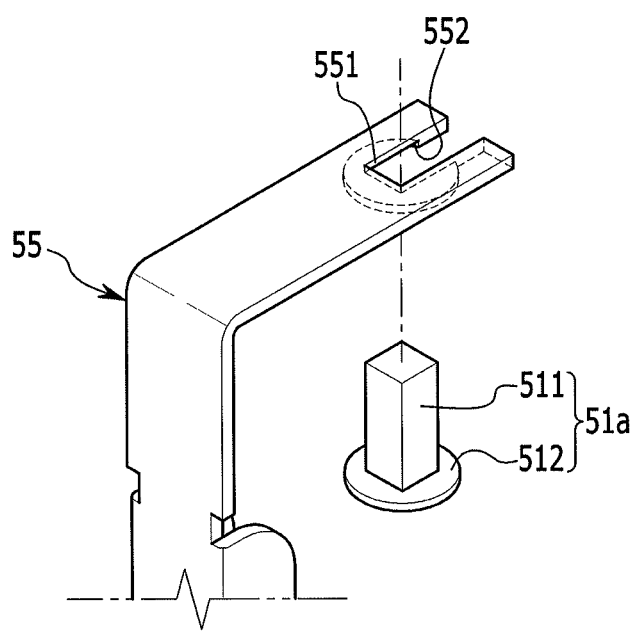
FIG. 8 illustrates a cross-sectional view of a rivet terminal and a lead tab of a rechargeable battery according to another exemplary embodiment.

FIG. 8 illustrates an exploded perspective view of a rivet terminal and a lead tab of a rechargeable battery according to another exemplary embodiment.

Referring to FIG. 8, in this exemplary embodiment, an opening 551 of a negative electrode lead tab 55 may be quadrangular-shaped, and a column portion 511 of a rivet terminal 51a may be formed in the shape of a quadrangular column corresponding to an inner surface of the opening 551. In addition, a flange portion 512 of the rivet terminal 51 may be formed as a circular plate at one end of the column portion

511. A receiving groove 552 may be formed in the shape of a circular groove corresponding to a curved surface of the flange portion 512.

The rivet terminal 51a may be inserted from a side direction of an insertion portion of the negative electrode lead tab 55, formed as the opening 551. Thus, the rivet terminal 51a of this exemplary embodiment may be easily coupled with the negative electrode lead tab 55.

In addition, in a state that the column portion 511 of the rivet terminal 51a is inserted into the opening 551, the receiving groove 552 may be stably coupled with the flange portion 512. That is, the rivet terminal 51a may firmly maintain the coupling state without rotation in a terminal hole (not shown) in a cap plate.

In a state that the column portion 511 of the rivet terminal 51a is inserted into the opening 551, the negative electrode lead tab 55 may be welded in a surface contact manner to the flange portion 512 along an inner surface of an external circumference of the opening 551.

By way of summation and review, a rechargeable battery may include an electrode assembly performing charging and discharging, a case receiving the electrode assembly, a cap plate coupled to an opening of the case, and a lead tab connecting the electrode assembly to an electrode terminal.

The electrode terminal may include a plate terminal disposed in an external surface of the cap plate and a rivet terminal disposed in an inner surface of the cap plate and connected to the plate terminal through the cap plate.

The rivet terminal and the lead tab may be physically and electrically connected with each other by inserting the rivet terminal into a hole of the lead tab and caulking an end of the rivet terminal. In addition, a flange portion of the rivet terminal and a plate of the lead tab may be laser-welded to reduce electric resistance between the rivet terminal and the lead tab.

As described, the rivet terminal and the lead tab may be caulked, and subsequently, the rivet terminal and the lead tab may be laser-welded to connect the rivet terminal and the lead. Therefore the connection process may be complicated.

In contrast, embodiments herein may provide a rechargeable battery that may simplify a connection process of an electrode terminal and a lead tab. According to an exemplary embodiment, the column portion of the electrode terminal is inserted into the insertion portion of the lead tab, and the flange of the electrode terminal is welded in a surface contact manner to an inner surface of an external circumference of the insertion portion such that a connection process of the electrode terminal and the lead tab may be simplified.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A rechargeable battery, comprising:
   an electrode assembly that performs charging and discharging;
   a case in which the electrode assembly is installed;
   a cap plate coupled to the case;
   a lead tab connected to an electrode of the electrode assembly; and
   an electrode terminal in the cap plate and connected to the lead tab,
   the electrode terminal including a column portion inserted into a terminal hole of the cap plate and a flange portion at one end of the column portion, the flange portion being wider than a cross-section of the column portion, and the flange portion being at an inner side of the cap plate, and
   the lead tab including an insertion portion into which the column portion is inserted and a concave receiving groove corresponding to the flange portion, the concave receiving groove extending from the insertion portion at an inner surface of the lead tab and receiving the flange portion at a side of the lead tab facing oppositely from the cap plate, the lead tab being welded in a surface contact manner to the flange portion along an inner surface of an external circumference of the insertion portion, a surface of the flange portion facing oppositely from the cap plate and a surface of the side of the lead tab facing oppositely from the cap plate forming a flush surface.

2. The rechargeable battery as claimed in claim 1, wherein the insertion portion is in a form of a through-hole in the lead tab, the insertion portion corresponding to the column portion of the electrode terminal.

3. The rechargeable battery as claimed in claim 2, wherein:
   the through-hole is in a shape of a circle, and
   the column portion is in the shape of a circular cylinder corresponding to the through-hole.

4. The rechargeable battery as claimed in claim 3, wherein:
   the flange portion of the electrode terminal is in a form of a quadrangular plate at one end of the column portion, and
   the receiving groove is in a form of a quadrangular groove corresponding to the flange portion.

5. The rechargeable battery as claimed in claim 2, wherein:
   the through-hole is quadrangle-shaped, and
   the column portion is in a shape of a quadrangular column corresponding to the through-hole.

6. The rechargeable battery as claimed in claim 5, wherein:
   the flange portion of the electrode terminal is in a form of a circular plate at one end of the column portion, and
   the receiving groove is in a form of a circular groove corresponding to the flange portion.

7. The rechargeable battery as claimed in claim 1, wherein the insertion portion is in a form of an opening having one side opened in the lead tab to correspond to the column portion of the electrode terminal.

8. The rechargeable battery as claimed in claim 7, wherein:
   the opening is in a shape of a semi-circular curved surface with one open side, and
   the column portion is in a shape of a circular cylinder corresponding to the curved surface of the opening.

9. The rechargeable battery as claimed in claim 8, wherein:
   the flange portion of the electrode terminal is in a form of a circular plate at one end of the column portion, and
   the receiving groove is in a form of a circular groove corresponding to the curved surface of the flange portion.

10. The rechargeable battery as claimed in claim 7, wherein the opening is formed in a shape of a quadrangle having one open side, and the column portion is formed in a shape of a quadrangular column corresponding to the inner surface of the opening.

11. The rechargeable battery as claimed in claim 10, wherein:
   the flange portion of the electrode terminal is in a form of a circular plate at one end of the column portion, and
   the receiving groove is in a form of a circular groove corresponding to the curved surface of the flange portion.

* * * * *